Oct. 9, 1923.
W. LA VALLEY
ANIMAL TRAP
Filed March 26, 1923    2 Sheets-Sheet 1
1,470,453
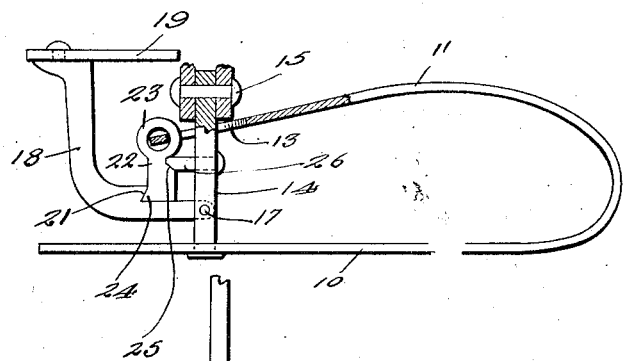
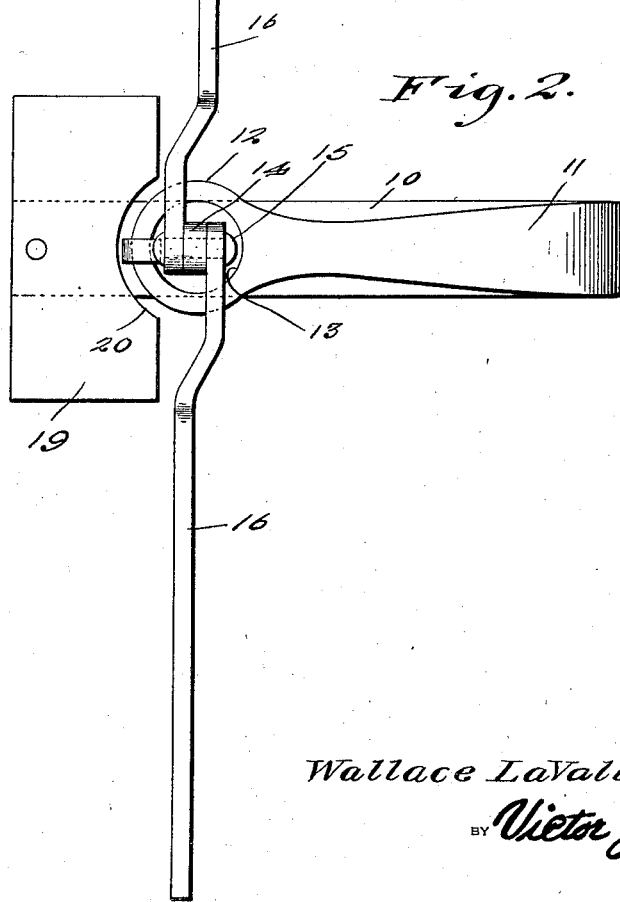
Wallace LaValley INVENTOR
BY Victor J. Evans ATTORNEY
WITNESSES Oct. 9, 1923.　　　W. LA VALLEY　　　1,470,453
ANIMAL TRAP
Filed March 26, 1923　　2 Sheets-Sheet 2
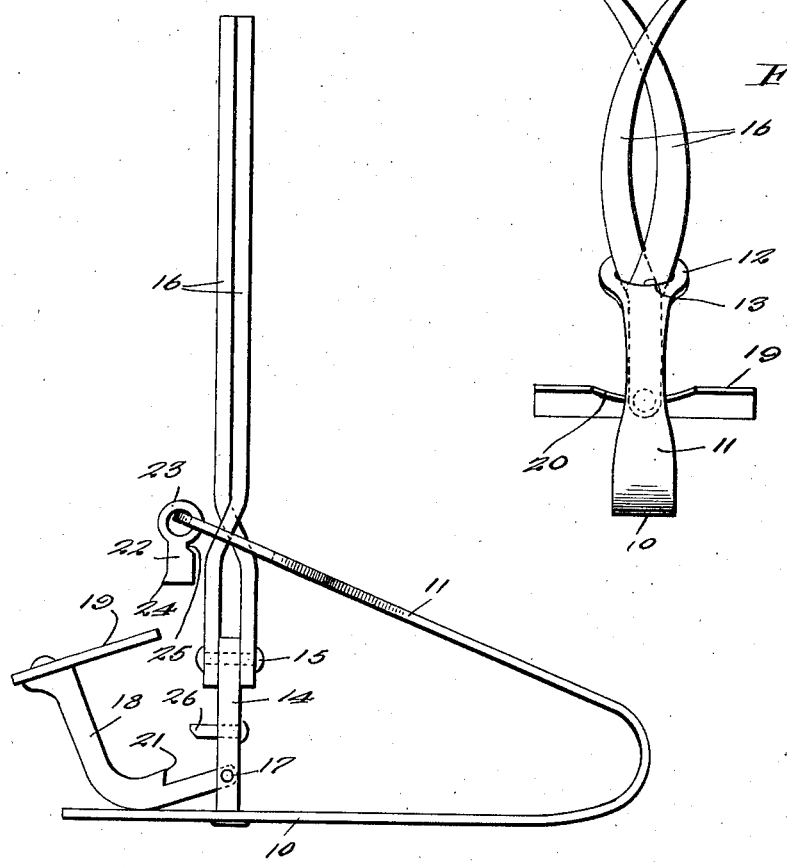
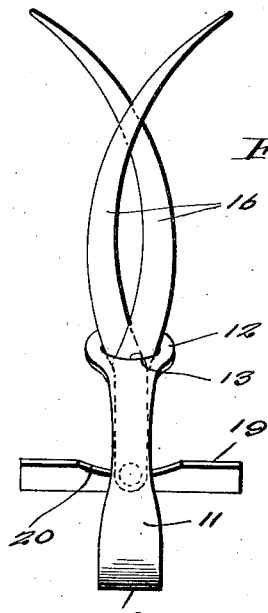
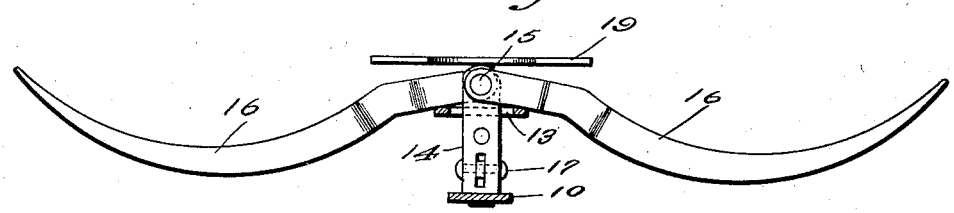
Wallace LaValley, INVENTOR Patented Oct. 9, 1923.

1,470,453

UNITED STATES PATENT OFFICE.

WALLACE LA VALLEY, OF HANCOCK, NEW YORK.

ANIMAL TRAP.

Application filed March 26, 1923. Serial No. 627,781.

*To all whom it may concern:*

Be it known that I, WALLACE LA VALLEY, a citizen of the United States, residing at Hancock, in the county of Delaware and State of New York, have invented new and useful Improvements in Animal Traps, of which the following is a specification.

This invention relates to traps for catching animals of various kinds, particularly to traps of the spring jaw type, and has for its object the provision of a trap so constructed and arranged that the jaws thereof will grip the neck or body of the animal instead of catching it by a foot or leg, the device consequently being more humane than the ordinary type and having the additional advantages of preventing any possible escape of the animal caught.

An important object is the provision of a trap of this character having a novel treadle released trigger for holding it in set position.

An additional object is the provision of a device of this character which will be simple and inexpensive in manufacture, highly efficient in use, durable in service and a general improvement in the art.

With the above and other objects and advantages in view the invention consists in the details of construction to be hereinafter more fully described and claimed and illustrated in the accompanying drawings, in which:

Figure 1 is a side elevation of the trap partly in section, showing it in set position, Figure 2 is a plan view thereof, Figure 3 is a side elevation showing the trap sprung, Figure 4 is a front elevation showing the set position, Figure 5 is a front elevation showing the sprung position.

Referring more particularly to the drawings I have shown the trap as comprising a base 10 which has one end curved upwardly and over upon itself to form the actuating spring 11. It is of course obvious that the material must be such that this spring member 11 will have the necessary resilience to exert a springing action. At its free end this spring 11 is formed with a widened portion 12 having a hole 13 therein. Suitably secured to and rising from the base 10 is a post 14 through the upper end of which passes a rivet or the like 15 pivoting the jaws 16. There are two jaws as clearly disclosed and they are curved so that when they come together in their sprung position they will engage against opposite sides of the animal and effect a firm gripping action which will positively prevent escape. These jaws are of course so positioned as to be actuated by the spring 11 upon release of the trigger mechanism to be described.

Pivoted at 17 upon the post 14 is an arm 18 of curved shape having its upper end carrying a rectangular or other shaped treadle 19 which is partially cut away at its edge toward the jaws, as shown at 20 to permit the widened end 12 of the spring to operate. Near its pivot this arm 18 is formed with a retaining shoulder 21 which overhangs as shown and with which co-operates a trigger 22 having an eye 23 pivoted on the free end of the spring 11. This trigger is formed with a toe 24 engaging beneath the catch shoulder 21 and the edge of the trigger toward the post is formed with a notch 25 which engages a keeper pin 26 carried by the post.

In order to set the trap, pressure must be applied to the spring 11 to force it toward the base, and the jaws 16 are swung outwardly into horizontal position as shown in Figure 4. The trigger 22 is then swung to bring its notch 25 in engagement with the pin 26 and the arm 18 is swung upwardly to engage the toe 24 within the catch shoulder 21. The pressure upon the spring 11 is then relieved and the resilience of the spring tending to pull the trigger 22 upwardly will hold the parts in set position.

In the operation it will be seen that when an animal steps upon the treadle 19, the arm 18 will swing downwardly upon its pivot 17 which will release the shoulder 21 from the toe 24. There is then nothing to hold the trigger 22 and the free end thereof swings away from the post 14, the notch 25 disengaging the pin 26. As the upward movement of the spring 11 is consequently unrestrained, the engagement of the widened end 12 of the spring with the under edges of the jaws 16 will cause the latter to be swung forcibly upwardly. Owing to the fact that these jaws are curved they will cross as shown in Figure 5 and embracingly engage about the neck or body of the animal.

It is quite probable, especially in case of a very strong trap, that the animal will be killed and be prevented from suffering, but regardless of this fact it is quite apparent that the animal cannot escape.

From the foregoing description and a study of the drawings it will be apparent that I have thus provided a simply constructed and consequently inexpensive trap which is easily set and which is very delicate in its releasing action when tripped by an animal. Owing to the simplicity of the construction and the fewness of the parts it is apparent that there is practically nothing to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In a trap comprising a base, a spring extending from one end of and overlying the base with its free end widened and formed with an opening, a post rising from the base and carrying jaws pivoted thereon, the post and the jaws extending through said opening, and the jaws overlying the free end of the spring when in set position, a pin projecting laterally from said post, a trigger pivoted upon the free end of the spring and formed at one edge with a notch engaging said pin and having one corner at the opposite edge formed with a toe, an arm pivoted on the post and carrying a treadle, said arm being formed with a retaining shoulder engaging said toe.

In testimony whereof I affix my signature.

WALLACE LA VALLEY.